United States Patent [19]
Madura

[11] 3,893,710
[45] July 8, 1975

[54] SLACK-FREE FIFTH WHEEL SLIDER

[75] Inventor: Francis Eli Madura, Whiting, Ind.

[73] Assignee: Amsted Industries Incorporated, Chicago, Ill.

[22] Filed: June 3, 1974

[21] Appl. No.: 475,588

[52] U.S. Cl. .......................................... 280/407
[51] Int. Cl. ............................................ B62d 53/06
[58] Field of Search ...... 280/407, 438 R, 441, 80 B; 292/40

[56] References Cited
UNITED STATES PATENTS

| | | | |
|---|---|---|---|
| 684,017 | 10/1901 | Wellman | 292/40 |
| 2,860,891 | 11/1958 | Ramun | 280/80 B |
| 2,985,463 | 5/1961 | Geerds | 280/407 |
| 3,606,384 | 9/1971 | Fontaine et al. | 280/407 |
| 3,722,914 | 3/1973 | Walther | 280/407 |

Primary Examiner—Leo Friaglia
Assistant Examiner—R. Schrelengost
Attorney, Agent, or Firm—Andrew J. Bootz; Ralph M. Faust; Fred P. Kostka

[57] ABSTRACT

A slider for a fifth wheel for selectively positioning the fifth wheel on a tractor frame. The slider includes a pair of laterally spaced racks which are fixed relative to the frame and a fifth wheel support which is movable lengthwise of the frame. Spring biased latch means extending toward the racks are carried by the support and include a pair of spaced tapered pins which are normally biased toward the racks. The tapered pins are supported in a housing having means for wedging the pins into engagement with the surfaces on teeth located on the opposite sides of a selective tooth thereby to maintain the support locked against lengthwise movement. Release means is provided for withdrawing the tapered pins from engagement with the rack teeth to permit lengthwise sliding and repositioning of the support.

15 Claims, 6 Drawing Figures

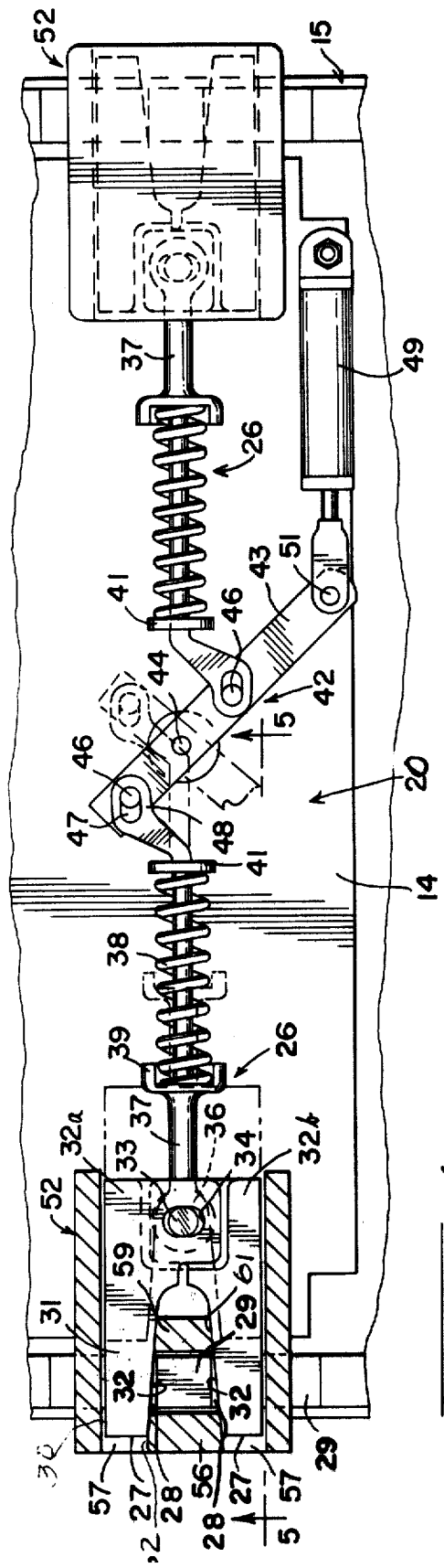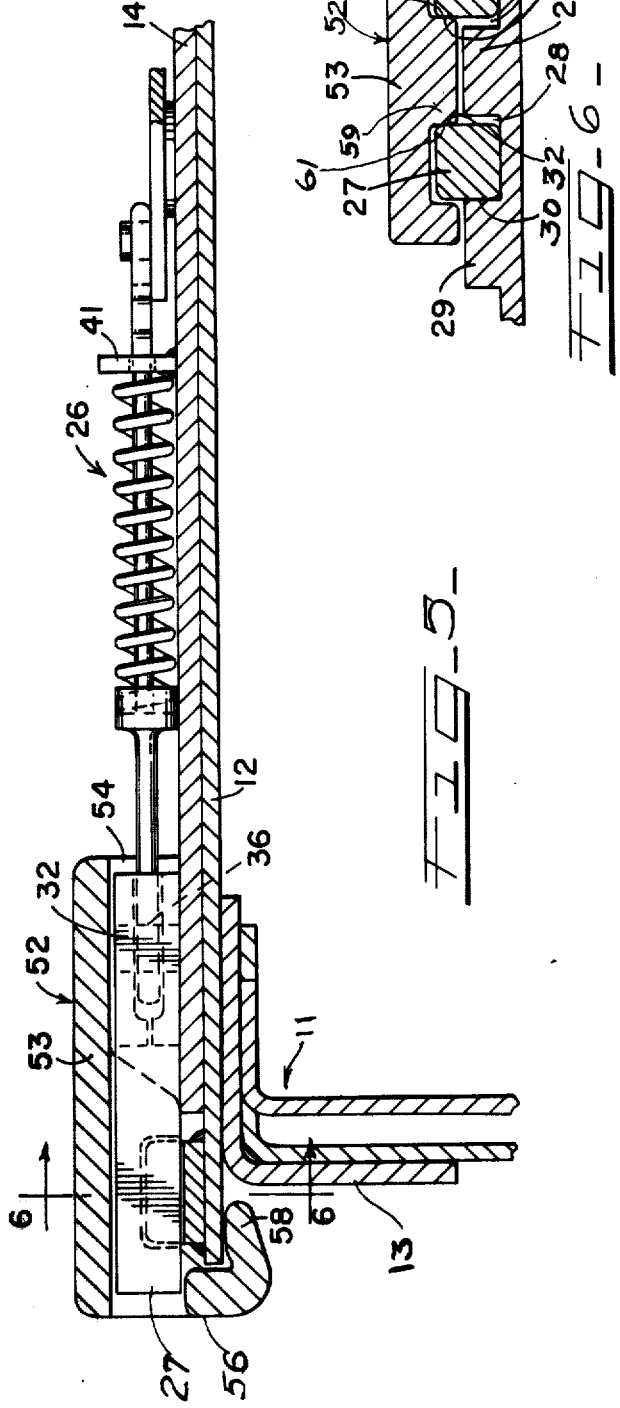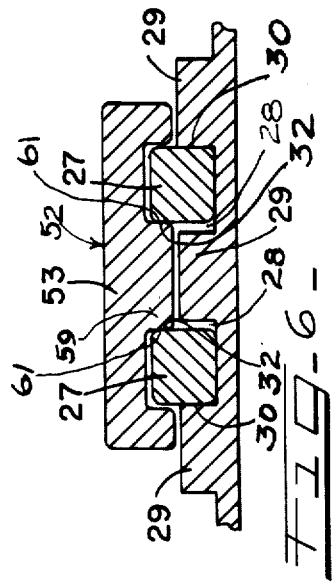

SLACK-FREE FIFTH WHEEL SLIDER

BACKGROUND AND SUMMARY OF THE INVENTION

The present invention relates to sliders for fifth wheel plates and more particularly to an improved latching arrangement for the slider.

The slider of the present invention comprises generally a pair of laterally spaced racks which are fixedly secured to the frame. A fifth wheel support is slidable lengthwise of the racks and includes a pair of oppositely disposed latch means or members which are spring biased into engagement with respective ones of the racks. The latch means each include a pair of spaced tapered pins, which are seatable within the slots on the opposite sides of a selective one of the rack teeth. The pairs of tapered pins are guided within a housing having means for wedging the pins into wedging engagement with the sides of the teeth on the opposite sides of the selective tooth. Pivotal means connected each pair of pins to allow relative movement and thereby facilitate the alignment thereof into the slots and to assure a positive lock without any slack.

Further features will hereinafter appear.

BRIEF DESCRIPTION OF THE DRAWINGS

FIG. 4 is an enlarged fragmentary bottom plan view of the latch mechanism.

FIG. 5 is a cross-sectional view taken generally along the lines 5—5 of FIG. 4.

FIG. 6 is a cross-sectional view taken generally along the lines 6—6 of FIG. 5.

DESCRIPTION OF THE PREFERRED EMBODIMENT

Figure 1:
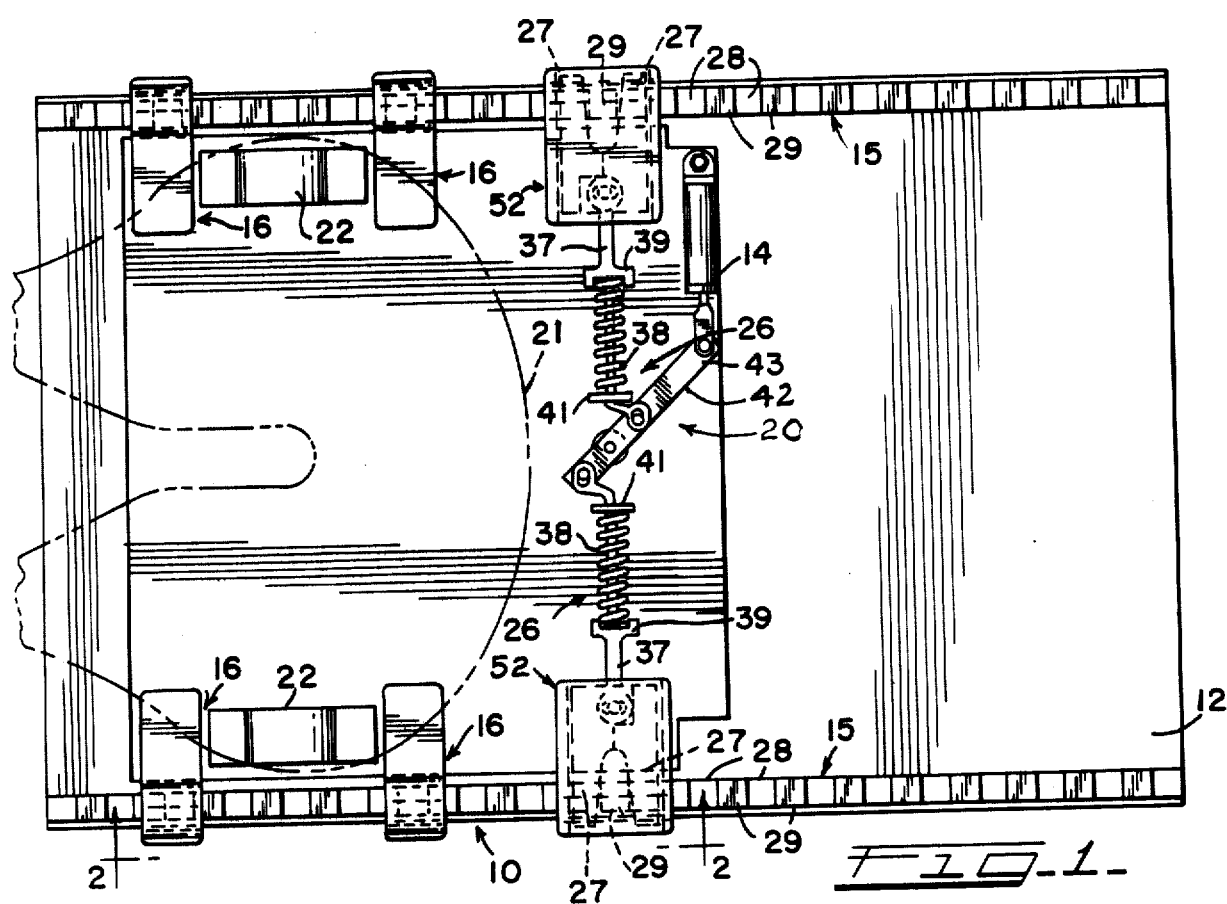
FIG. 1 is a top plan view of a slider embodying the structure of the present invention, with the fifth wheel shown in phantom.
Figure 2:
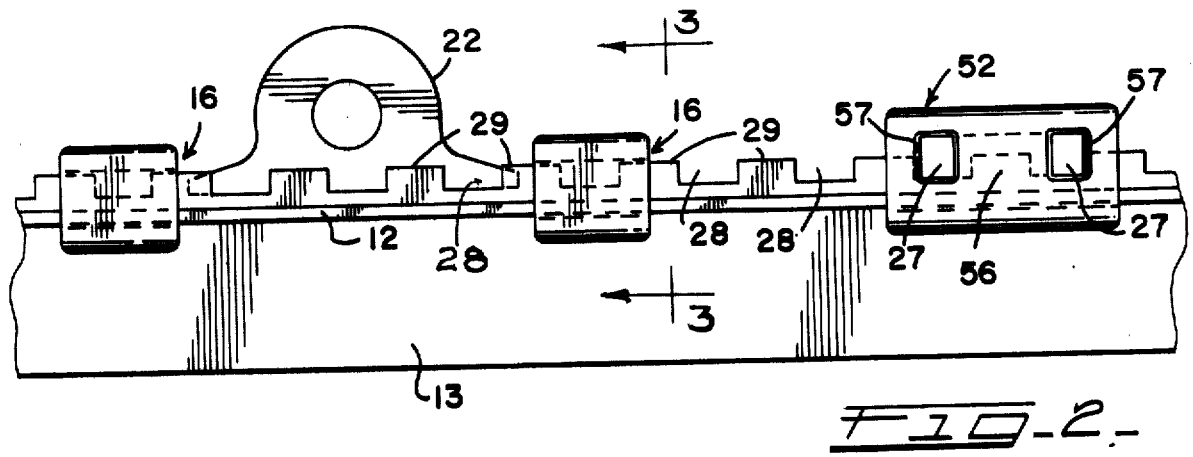
FIG. 2 is a fragmentary side elevational view of the slider taken generally along the lines 2—2 of FIG. 1.

Referring now to the drawings the slider 10 embodying the structure of the present invention is mounted on a frame 11 of a tractor used to haul semi-trailers. The slider 10 includes a mounting plate or base 12 which is fixed to an angle 13 of the tractor 11 as by means of welding. As shown the mounting plate 12 is fixed on the angles 13 so that longitudinal marginal portions project beyond the channels. Fixed to each of the marginal projecting portions of the plate 12 are racks 15.

Figure 3:
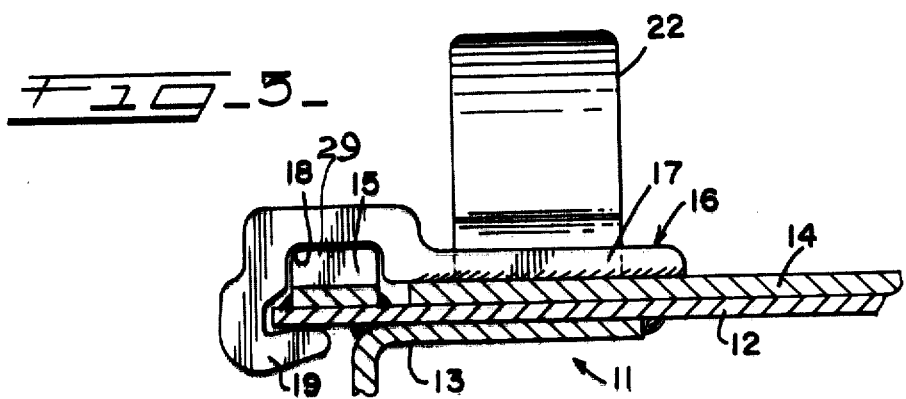
FIG. 3 is a fragmentary cross-sectional view taken generally along the lines 3—3 of FIG. 2 showing in particular the manner in which the slider is mounted on the tractor frame.

A fifth wheel support plate 14 is slidable on the mounting plate 12 and is guided for lengthwise movement thereon by guide fingers 16 fixed along the opposite edges of the support plate. As shown in particular in FIG. 3, the guide fingers 16 may be made by casting or the like and include an attachment limb 17 which is fixed by welding to the support plate 14. The other end of the finger 16 is shaped to provide a recess 18 which accommodates the rack 15. A hook 19 is formed on the free end and underlies the marginal portion of the base or mounting plate 12 to retain the fifth wheel support plate 14 slidably supported thereon. In this manner the support plate 14 also is guided for lengthwise movement on the base plate 12.

A latch assembly 20 is carried by the support plate 14 for selectively positioning a fifth wheel 21 which is mounted thereon by means of trunnions 22, also fixed to the support plate 14. The latch assembly 20 as shown in FIGS. 4 and 5 includes a pair of laterally disposed latch subassemblies 26 of generally similar construction. Each subassembly includes a pair of tapered pins of fingers 27—27 which are seatable within spaces or slots 28 between the teeth 29 of the rack 15. The fingers 27—27 each include limbs 31 having inner tapered edges 32—32 which merge at the inner ends thereof into a generally arcuate edge. The inner ends of the fingers 27—27 are formed with overlapping limbs 32a and 32b extending at generally right angles or normal to the tapered limbs 31. A pin 33 extending through somewhat elongated slots 34 provided in the overlapping limbs 32a and 32b serves to pivotally connect the fingers 27—27 to facilitate alignment and seating within the rack slots 28 as more fully to be explained hereinafter.

An eye 36 on the end of a rod 37 and received within complementary recesses formed in the limbs 32a and 32b embraces the pin 33 so that lateral movement of the rod 37 toward and away from the rack 15 is operative to retract and seat the fingers 27—27 in the slots 28—28. A compression spring 38 embracing the rod 37 and extending between a shoulder 39 on the rod 37 and a stop plate 41 fixed to the plate 14 serves to normally urge the fingers 27—27 into engagement with the slots 28—28.

A release subassembly 42 is attached to the rods 37 for retracting the fingers 27—27 from the rack 15. The release subassembly 42 includes a pivot bar 43 which is pivotally mounted on the support plate 14 by means of a pivot pin 44. A pair of pins 46—46 equidistantly spaced from the pivot pin 44 are fixed to the bar 43 and accommodated within elongated slots 47 in offset ends of the rods 37. Turning of the bar clockwise as viewed in FIG. 4 causes the rods 37 to be pulled inwardly against the force of the biasing spring 38.

A piston unit 49 is pivotally connected to an extended end of the bar 43 by means of a pin 51. The piston unit 49 is connected to a suitable source of pneumatic pressure (not shown) readily available on the tractor. Activation of the piston unit 49 causes the bar to be rotated about the pivot pin 44 against the biasing force exerted by the springs 38 on the rods 37. It should be understood that a manually actuated means such as a rod or the like may be used rather than the pneumatically actuated piston.

A guide housing 52 encloses the fingers 27—27 and includes an upper or top wall 53 and depending side walls 54 along each edge. A front wall 56 depends from the front edge of the top wall 53 and is provided with a pair of openings 57 which serve to guide the fingers 27—27. The front wall 56 is also provided with a hook 58 at the lower end thereof which underlies the plate 12 and thereby also serves to cooperate with the guides 16 to assist in maintaining the support plate 14 aligned with the base plate 12. An intermediate wall 59 parallel to and spaced from the front wall lies on the opposite side of the rack teeth 29 and is spaced at its ends 61—61 from the side walls 54 to define an opening for the passage of the fingers 27—27. The ends 61—61 of the intermediate wall 59 and the ends 62—62 defining the inner sides of the openings 57 are tapered complementary to the tapered edges 32—32 of the fingers 27. (See FIGS. 4 and 6).

In operation the piston 49 is usually deactivated so that the spring biasing force of the springs 38 is operative to urge the limbs 31—31 of the fingers between the slots 28—28 adjacent one of the teeth 29. In this connection it is to be noted that the fingers 27—27 are pivotally connected relative to each other by the pin 33 so as to facilitate the alignment with the slots 28. When disposed within the slots 28—28 the taper edges 32—32 are engagable with the complementary tapered edges 61—61 and 62—62 of the housing 52 so that the opposite edges 30—30 are wedged against the sides of the teeth 29—29 on the opposite sides of the selective tooth. This wedging engagement assures a positive stop and prevents any slack between the support plate 14 and the base plate 12.

When it is desired to shift the plate 14 the piston 49 is actuated. This causes the fingers 27—27 to be withdrawn from the slots 28 against the force exerted by the biasing springs 38. The support plate 14 may then be slid longitudinally along the base plate 12. During the sliding movement the plate is guided by the guides 16 and the latch housing 52. When the fifth wheel 21 is in the desired position, the piston 49 is again deactivated whereupon the latch fingers 27—27 seat within the slots 28—28 adjacent the selective one of the teeth 29.

What is claimed is:

1. A fifth wheel slider for adjustably positioning a fifth wheel on the frame of a tractor, said slider comprising a base plate adapted to be fixedly attached on a tractor, a pair of laterally spaced racks including a plurality of teeth having parallel side walls separated by spaces along the length thereof, fifth wheel support means mounted on said base for lengthwise movement and adapted to support a fifth wheel, latch means on said fifth wheel support means mounted for engagement with said rack teeth for retaining said support means fixed against lengthwise movement, said latch means including pairs of lengthwise spaced fingers have confronting tapered edges merging toward the inner end and parallel opposed edges disposable within the spaces and tapering to a width greater than the width of the space to wedgingly engage with the side walls of the teeth located on the opposite sides of one of said rack teeth of each of said racks to selectively position said fifth wheel support means on said base.

2. The invention as defined in claim 1 wherein said latch means includes a housing for each of said pairs of fingers, and said housing includes means for wedging said fingers into wedging engagement with said side walls of the teeth on opposite sides of said one tooth.

3. The invention as defined in claim 2 wherein resilient means biases and fingers into the spaces on the opposite sides of said selective one of said rack teeth and wedging engagement with said teeth on the opposite sides of said one tooth.

4. A fifth wheel slider for adjustably positioning a fifth wheel on the frame of a tractor, said slider comprising a base plate adapted to be fixedly attached on a tractor, a pair of laterally spaced racks including a plurality of teeth separated by spaces along the length thereof, fifth wheel support means mounted on said base for lengthwise movement and adapted to support a fifth wheel, latch means on said fifth wheel support means mounted for engagement with said rack teeth for retaining said support means fixed against lengthwise movement, said latch means including pairs of lengthwise spaced fingers disposable within the spaces and wedgingly engageable with the side walls of the teeth located on the opposite sides of one of said rack teeth of each of said racks to selectively position said fifth wheel support means on said base, said fingers being pivotally connected at one end to facilitate alignment into said spaces on the opposite sides of said one of said rack teeth, said latch means including a housing for each of said pairs of fingers, said housing including means for wedging said fingers into wedging engagement with said side walls of the teeth on opposite sides of said one tooth.

5. The invention as defined in claim 4 wherein retracting means are connected to said fingers for withdrawing said fingers from said spaces whereby said fifth wheel support means may slide lengthwise on said base.

6. The invention as defined in claim 5 wherein said fifth wheel support means includes guide means for guiding said fifth wheel support means for lengthwise movement on said base.

7. The invention as defined in claim 4 wherein said fingers are each generally L-shaped including a tapered limb insertable into said spaces and a pivot leg normal to said tapered limb, said pivot legs being in overlying relationship, and a pivot means extending through said legs and providing connection between said fingers.

8. The invention as defined in claim 7 wherein housing means is provided for each of said pairs of tapered fingers, and said housing means includes means for wedging said tapered fingers into engagement with said teeth on opposite sides of said one tooth.

9. The invention as defined in claim 8 wherein said pivot means is connected to said housing.

10. The invention as defined in claim 9 wherein said resilient means acts against said pivot means for biasing said fingers into said spaces.

11. The invention as defined in claim 10 wherein said resilient means is a spring disposed between said pivot means and a fixed member on said support means.

12. The invention as defined in claim 11 wherein retracting means are connected to said pivot means for withdrawing said fingers from said spaces against the biasing force of said spring.

13. The invention as defined in claim 12 wherein said retracting means is common to said tapered pin means along both racks.

14. Latch means for use with a rack having a plurality of spaced teeth, said latch means comprising a housing movable lengthwise of said rack, a pair of tapered fingers engageable within the spaces of a selective one of said rack teeth, means on said housing for guiding said tapered teeth into wedging engagement with the teeth on opposite sides of said selective one of said rack teeth, said fingers being pivotally connected at one end to facilitate alignment into said spaces on the opposite sides of said one of said rack teeth.

15. Latch means as defined in claim 14 including means biasing said tapered fingers into said spaces on opposite sides of said selective one of said teeth.

* * * * *